United States Patent
Eriksson Löwenmark et al.

(10) Patent No.: US 10,355,907 B2
(45) Date of Patent: Jul. 16, 2019

(54) TRANSMITTER, RECEIVER AND METHODS THEREIN FOR WIRELESS COMMUNICATION

(71) Applicant: Telefonaktiebolaget L M Ericsson (publ), Stockholm (SE)

(72) Inventors: Stefan Eriksson Löwenmark, Färentuna (SE); Miguel Lopez, Solna (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 629 days.

(21) Appl. No.: 14/758,716

(22) PCT Filed: Jun. 15, 2015

(86) PCT No.: PCT/SE2015/050690
§ 371 (c)(1),
(2) Date: Jun. 30, 2015

(87) PCT Pub. No.: WO2016/007070
PCT Pub. Date: Jan. 14, 2016

(65) Prior Publication Data
US 2016/0269216 A1    Sep. 15, 2016

Related U.S. Application Data

(60) Provisional application No. 62/023,453, filed on Jul. 11, 2014.

(51) Int. Cl.
| | | |
|---|---|---|
| H04L 27/34 | (2006.01) | |
| H04W 72/04 | (2009.01) | |
| H04L 27/00 | (2006.01) | |

(52) U.S. Cl.
CPC ...... H04L 27/3461 (2013.01); H04L 27/0008 (2013.01); H04W 72/04 (2013.01)

(58) Field of Classification Search
CPC ............ H04L 27/0008; H04L 27/0012; H04L 27/3461; H04W 72/04; H04W 72/0406
See application file for complete search history.

(56) References Cited

U.S. PATENT DOCUMENTS

2007/0098097 A1* 5/2007 Khan .................. H04B 7/0671
                                                              375/260
2007/0195907 A1   8/2007 Wang et al.
(Continued)

FOREIGN PATENT DOCUMENTS

WO        2009059946 A2    5/2009

OTHER PUBLICATIONS

Unknown, Author, "SAM—Single Antenna MIMO—for VAMOS", Change Request, Telefon AB LM Ericsson, 3GPP TSG-GERAN Meeting #42, Shenzhen, P. R. China, GP-090735, May 11-15, 2009, 1-38.

Primary Examiner — Hoang-Chuong Q Vu
(74) Attorney, Agent, or Firm — Sage Patent Group

(57) ABSTRACT

The embodiments herein relate to a method performed by a transmitter (12) for transmitting data in a wireless communications network (100). The transmitter (12) determines a change of a characteristic of a signal. The change of the characteristic is transparent to a first receiver (10) and carries information to a second receiver (13). The transmitter (12) applies the determined change of the characteristic to the signal. The transmitter (12) transmits the signal with the applied change to the first receiver (10) and the second receiver (13).

44 Claims, 11 Drawing Sheets

(56) References Cited

U.S. PATENT DOCUMENTS

| | | | |
|---|---|---|---|
| 2008/0069038 A1* | 3/2008 | Yamamoto | H04B 7/0413 370/328 |
| 2009/0322587 A1* | 12/2009 | Stayton | G01S 7/003 342/37 |
| 2010/0034186 A1* | 2/2010 | Zhou | H04L 27/2621 370/344 |
| 2010/0118992 A1* | 5/2010 | Terabe | H04B 7/022 375/260 |
| 2011/0105172 A1* | 5/2011 | Guo | H04B 7/0413 455/522 |
| 2012/0113963 A1 | 5/2012 | Liberg et al. | |
| 2012/0208523 A1* | 8/2012 | Hans | H04W 64/00 455/422.1 |
| 2013/0259011 A1* | 10/2013 | Nakashima | H04W 72/0473 370/336 |
| 2014/0044089 A1 | 2/2014 | Lopez et al. | |
| 2014/0079109 A1* | 3/2014 | Serbetli | H04L 25/067 375/224 |
| 2014/0247818 A1* | 9/2014 | Lopez | H04B 7/0617 370/337 |
| 2014/0314415 A1* | 10/2014 | Vassilieva | H04J 14/0227 398/76 |
| 2016/0204823 A1* | 7/2016 | Lovberg | H04B 1/40 375/219 |

* cited by examiner

TRANSMITTER, RECEIVER AND METHODS THEREIN FOR WIRELESS COMMUNICATION

TECHNICAL FIELD

Embodiments herein relate generally to a transmitter, a method performed by the transmitter, a second receiver and a method performed by the second receiver. More particularly the embodiments herein relate to retrieving information carried by a signal in a wireless communication network.

BACKGROUND

In a typical wireless communication network, also known as radio communications network, wireless terminals, also known as mobile stations and/or user equipments (UEs), communicate via a Radio Access Network (RAN) to one or more Core Networks (CN). The RAN covers a geographical area which is divided into cell areas, with each cell area being served by a base station, e.g., a Radio Base Station (RBS), which in some networks may also be called, for example, a NodeB or evolved Node B (eNodeB, eNB). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be a downlink cell and/or an uplink cell. The base stations communicate, transmit signals and/or receive signals, over the air interface operating on radio frequencies with the wireless devices within range of the base stations.

A Universal Mobile Telecommunications System (UMTS) is a third generation mobile communication system, which evolved from the second generation (2G) Global System for Mobile communications (GSM). The UMTS Terrestrial Radio Access Network (UTRAN) is essentially a RAN using Wideband Code Division Multiple Access (WCDMA) and/or High Speed Packet Access (HSPA) for wireless devices. In a forum known as the Third Generation Partnership Project (3GPP), telecommunications suppliers propose and agree upon standards for third generation (3G) networks and UTRAN specifically, and investigate enhanced data rate and radio capacity. In some versions of the RAN as e.g. in UMTS, several base stations may be connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g. eNodeBs in LTE, and the core network. As such, the RAN of an EPS has an essentially "flat" architecture comprising radio base stations without reporting to RNCs.

In GSM and many other transmission systems, the transmitted signal consists of bursts of high energy, separated by periods with low or no energy, so called guard periods. The transmitted information is represented in the high energy part using a digital modulation such as Gaussian Minimum Shift Keying (MSK), Binary Phase-Shift Keying (BPSK), Quadrature Phase-Shift Keying (QPSK), 8 Phase-Shift Keying (8PSK), 16-state Quadrature Amplitude Modulation (16QAM), etc. In a baseband representation, a burst can be described by a trajectory in the complex, In-phase/Quadrature (I/Q) plane, starting and ending at, or close to, origin at the start and end of the burst, respectively. The trajectory as a function of time represents the information bits that are transferred by the burst. For example, the phase, the amplitude, the frequency or combinations thereof can be used to convey the information.

When a burst is transmitted over a channel, the amplitude, phase and/or timing of the burst may be impacted in a way that is not known a priori to the transmitter or receiver. Therefore, in coherent wireless communications systems, the information is not carried in the absolute phase and/or amplitude of the transmitted signal, but rather the phase/amplitude relative to a predetermined part of the burst, known to both the transmitter and the second receiver. The known part is sometimes referred to as training symbols or pilot symbols.

On many channels, for instance radio channels, the signal is also subject to time dispersion. The way the channel causes time dispersion must be known to the second receiver in order for it to compensate for the dispersion to correctly demodulate it. To facilitate this, the bursts in many transmission systems contain a sequence of known symbols, called e.g. training sequence, preamble or midamble. This is used both to estimate the time dispersion of the channel, and the time/phase/amplitude reference. Due to this, an entire transmitted burst can be amplified/attenuated, phase shifted and/or time shifted, within reasonable limits, without changing the information carried by the burst. Hence, the transmission link must be robust enough to handle such modifications.

There are transmission modes where the absolute phase of the transmitted signal need to be well defined, for example when applying spatial beam forming, or when the signal needs to follow a relative phase shift in-between transmissions, for example when applying space time codes. This is however generally not the case, and is especially not required for GSM.

SUMMARY

Current systems are not using a potential channel of information available. That is, in the same way as the radio channel is carrying phase and amplitude information that can be estimated at the receiver, as described above, the same way may an amplitude and/or phase and/or time shift variation relative to a reference be added to the transmitted signal, provided that the transmitter has knowledge about the absolute phase/amplitude/time shift of the signal, and can hence alter it. These additional variations would carry additional information of the transmitted signal.

An objective of embodiments herein is to obviate at least one of the above disadvantages and to provide a mechanism that improves performance or efficiency of a wireless communication network.

According to a first aspect, the object is achieved by a method performed by a transmitter for transmitting data in a wireless communications network. The transmitter determines a change of a characteristic of a signal. The change of the characteristic is transparent to a first receiver and carries information to a second receiver. The transmitter applies the determined change of the characteristic to the signal. The transmitter transmits the signal with the applied change to the first receiver and the second receiver.

According to a second aspect, the object is achieved by a method performed by a second receiver for retrieving information carried by a signal in a wireless communication network. The second receiver receives a signal with an applied change of a characteristic from a transmitter. The change of the characteristic is transparent to a first receiver and carries information to the second receiver. The second receiver detects the change of the characteristic of the signal by utilizing a reference signal. The second receiver retrieves the information to the second receiver carried by the signal based on the detected change of the characteristic.

According to a third aspect, the object is achieved by a transmitter for transmitting data in a wireless communications network. The transmitter is configured to determine a change of a characteristic of a signal. The change of the characteristic is transparent to a first receiver and carries information to a second receiver. The transmitter is configured to apply the determined change of the characteristic to the signal. The transmitter is configured to transmit the signal with the applied change to the first receiver and the second receiver.

According to a fourth aspect, the object is achieved by a second receiver for retrieving information carried by a signal in a wireless communication network. The second receiver is configured to receive a signal with an applied change of a characteristic from a transmitter. The change of the characteristic is transparent to a first receiver and carries information to the second receiver. The second receiver is configured to detect the change of the characteristic of the signal by utilizing a reference signal. The second receiver is configured to retrieve the information to the second receiver carried by the signal based on the detected change of the characteristic.

Since the signal carries changed characteristics to the second receiver which is transparent to the first receiver, the performance or efficiency of a wireless communication network is improved.

Embodiments herein afford many advantages, of which a non-exhaustive list of examples follows:

- A low bit rate channel can be created from an existing channel.
- The new channel is transparent to the first receiver on the existing channel.
- The new channel does not consume any resources since it only utilizes unused burst characteristics.
- The new channel is robust to noise if several training symbols can be used in each burst to estimate relative changes in burst characteristics, e.g. the phase shift. E.g. for GSM, the 26 bit training sequence will allow a processing gain of 13-14 dB compared to the existing channel.
- The transmitter has very low complexity.
- The second receiver has very low complexity since there is no need for channel estimation, equalization, etc.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to a super channel for information transfer on an existing channel utilizing non-information bearing signal parameters.

Figure 1:
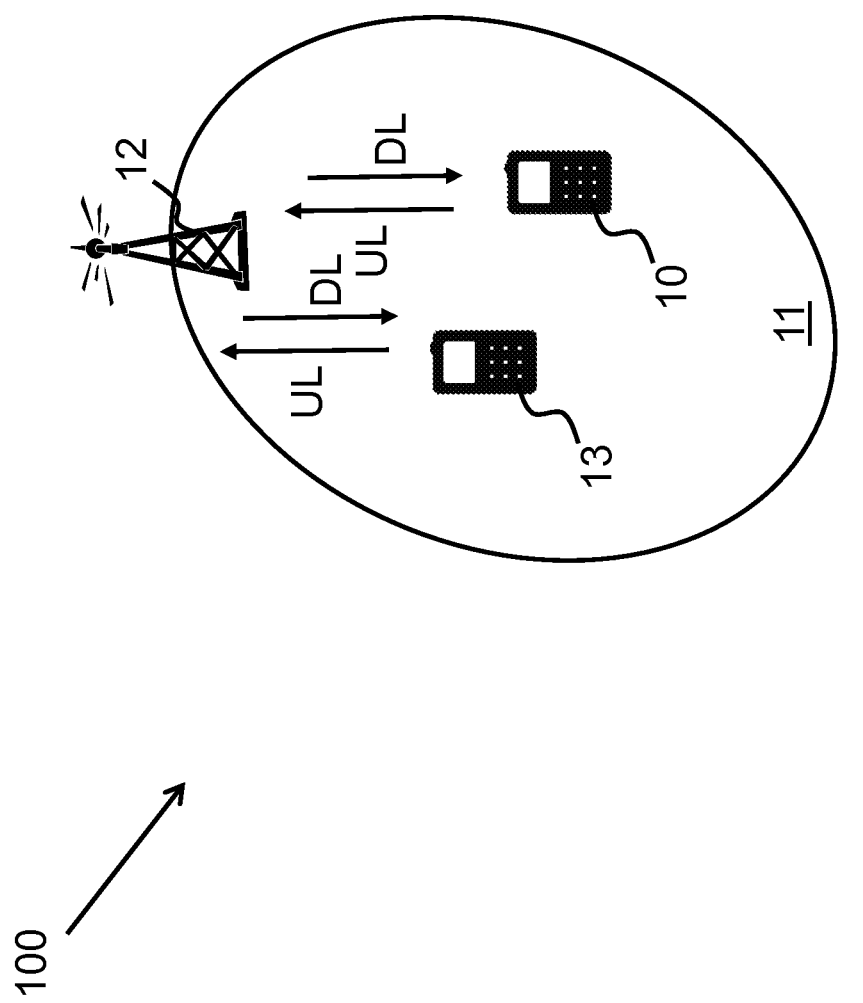
FIG. 1 is a schematic overview depicting a wireless communication network.

Embodiments herein relate to wireless communication networks in general. FIG. 1 is a schematic overview depicting a wireless communication network 100. The wireless communication network 100 comprises one or more RANs and one or more CNs. The wireless communication network 100 may use a number of different technologies, such as LTE, LTE-Advanced, WCDMA, GSM/Enhanced Data rate for GSM Evolution (GSM/EDGE), Worldwide Interoperability for Microwave Access (WiMax), Ultra Mobile Broadband (UMB), Wi-Fi, just to mention a few possible implementations. The wireless communication network 100 is exemplified herein as an LTE network.

In the wireless communication network 100, a wireless device 10, also known as a first wireless device, mobile station, a user equipment and/or a wireless terminal, communicates via a RAN to one or more CNs. It should be understood by the skilled in the art that "wireless device" is a non-limiting term which means any wireless terminal, user equipment, Machine Type Communication (MTC) device, a Device to Device (D2D) terminal, Internet of Things (IoT) device or node e.g. Personal Digital Assistant (PDA), laptop, mobile, sensor, relay, mobile tablets or even a small base station communicating within respective cell.

The wireless communication network 100 covers a geographical area which is divided into cell areas, e.g. a cell 11 being served by a radio base station 12. The radio base station 12 may also be referred to as a first radio base station and e.g. a NodeB, an evolved Node B, a base transceiver station, Access Point Base Station, base station router, or any other network unit capable of communicating with a wireless device within the cell served by the radio base station 12 depending e.g. on the radio access technology and terminology used. The radio base station 12 may serve one or more cells, such as the cell 11.

A cell 11 is a geographical area where radio coverage is provided by radio base station equipment at a base station site or at remote locations in Remote Radio Units (RRU). The cell definition may also incorporate frequency bands and radio access technology used for transmissions, which means that two different cells 11 may cover the same geographical area but using different frequency bands. Each cell 11 is identified by an identity within the local radio area, which is broadcast in the cell 11. Another identity identifying the cell 11 uniquely in the whole wireless communication network 100 is also broadcasted in the cell 11. The radio base station 12 communicates over the air or radio interface operating on radio frequencies with the first wireless device 10 within range of the radio base station 12. The first wireless device 10 transmits data over the radio interface to the radio base station 12 in UpLink (UL) transmissions and the radio base station 12 transmits data over an air or radio interface to the first wireless device 10 in DownLink (DL) transmissions. The radio base station 12 may also communicate with a second wireless device 13 in the cell 11. In embodiments herein a transmitter is transmitting a signal or a burst of energy to a first receiver and/or a second receiver. In the illustrated exampled herein the transmitter is exemplified as the radio base station 12 and the receivers are exemplified as the first wireless device 10 and the second wireless device 13, respectively. However, the transmitter may be a wireless device and the receivers may be one or more radio base stations. Furthermore, it should be noted that the first and second receiver may be the same receiver.

In the following, the reference number 10 will be used when referring to the first receiver, regardless of whether it is a radio base station or a wireless device. The reference number 12 will be used when referring to the transmitter regardless of whether it is a radio base station or a wireless device. The reference number 13 will be used when referring to the second receiver, regardless of whether it is a radio base station or a wireless device.

It should be noted that the communication links in the wireless communication network 100 may be of any suitable kind including either a wired or wireless link. The link may use any suitable protocol depending on type and level of layer (e.g. as indicated by the Open Systems Interconnect (OSI) model) as understood by the person skilled in the art.

When a burst is transmitted over a channel, the amplitude, phase and/or timing of the burst may be impacted in a way that is not known a priori to the transmitter or receiver. Therefore, the information is not carried in the absolute phase and/or amplitude of the transmitted signal, but rather the phase/amplitude relative to a predetermined part of the burst, known to both the transmitter and the receiver. This known part is sometimes referred to as training symbols or pilot symbols.

Due to this, an entire transmitted burst can be amplified/attenuated, phase shifted and/or time shifted (within reasonable limits) without changing the information carried by the burst. Hence, the transmission link must be robust enough to handle such modifications.

The idea of the embodiments herein is to let one or more relative changes in characteristics, e.g. burst characteristics such as a burst phase, amplitude and/or timing, of a signal that are transparent to the first receiver 10, carry information to the second receiver 13. The changes will be interpretable by the second receiver 13 as long as changes caused by the channel and/or transmitter/receiver impairments happen at a slower pace than changes introduced by the transmitter 12, or if they can be predicted.

Figure 2:
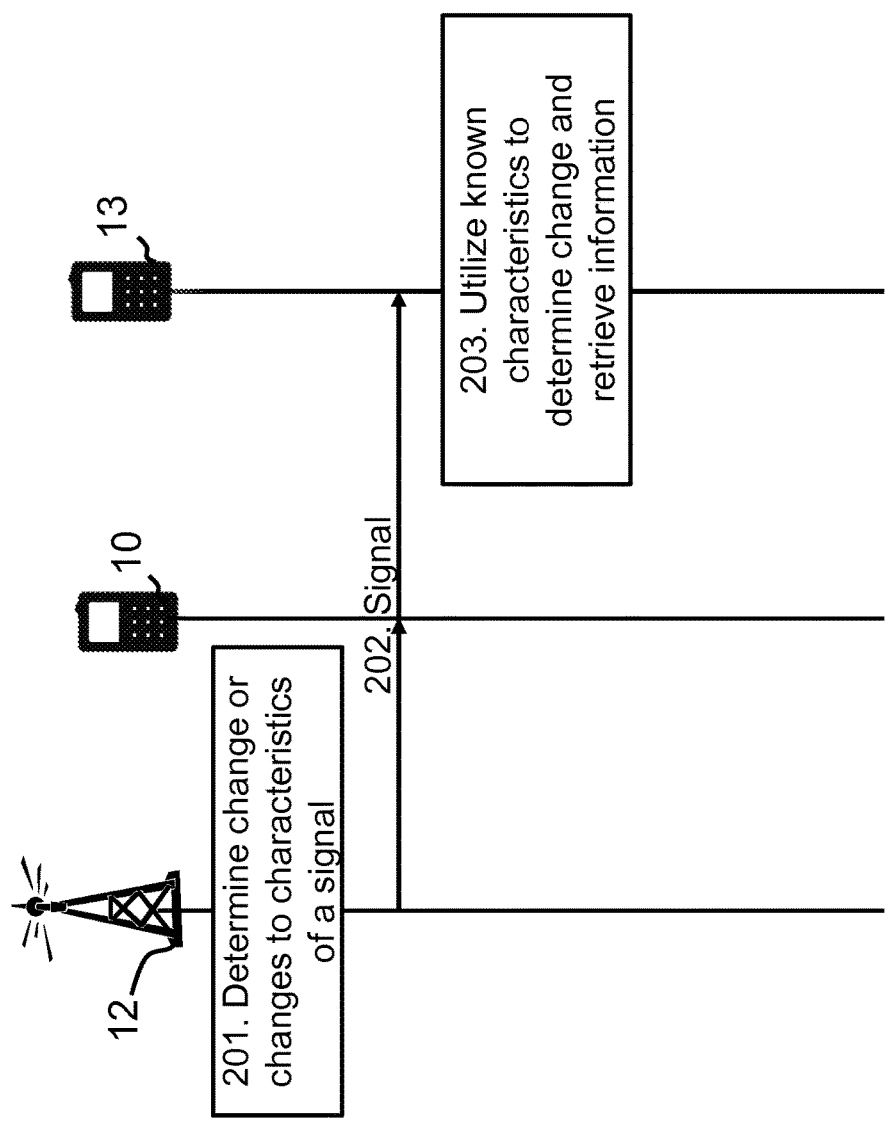
FIG. 2 is a combined flowchart and signaling scheme according to embodiments herein.

FIG. 2 is a combined flowchart and signaling scheme according to embodiments herein.

Action 201.

The radio base station 12, the transmitter 12 in the illustrated embodiment, determines a change or a relative change in a characteristic of a signal for carrying information to the second wireless device 13, the second receiver 13 in the illustrated example.

Action 202.

The radio base station 12 then applies the change or changes and transmits the signal to the second wireless device 13. The signal may also be transmitted to the first wireless device 10, the first receiver 10 in the illustrated example, wherein the characteristics of the signal carry information for the first wireless device 10. In other words, the signal carries information to the first wireless device 10 (e.g. by modulating the phase and/or amplitude according to the value of the information bits intended for the receiver 10).

Action 203.

The second wireless device 13 receives and utilizes a known part of the signal to detect the information bearing changes in the characteristics of the signal.

Figure 3:
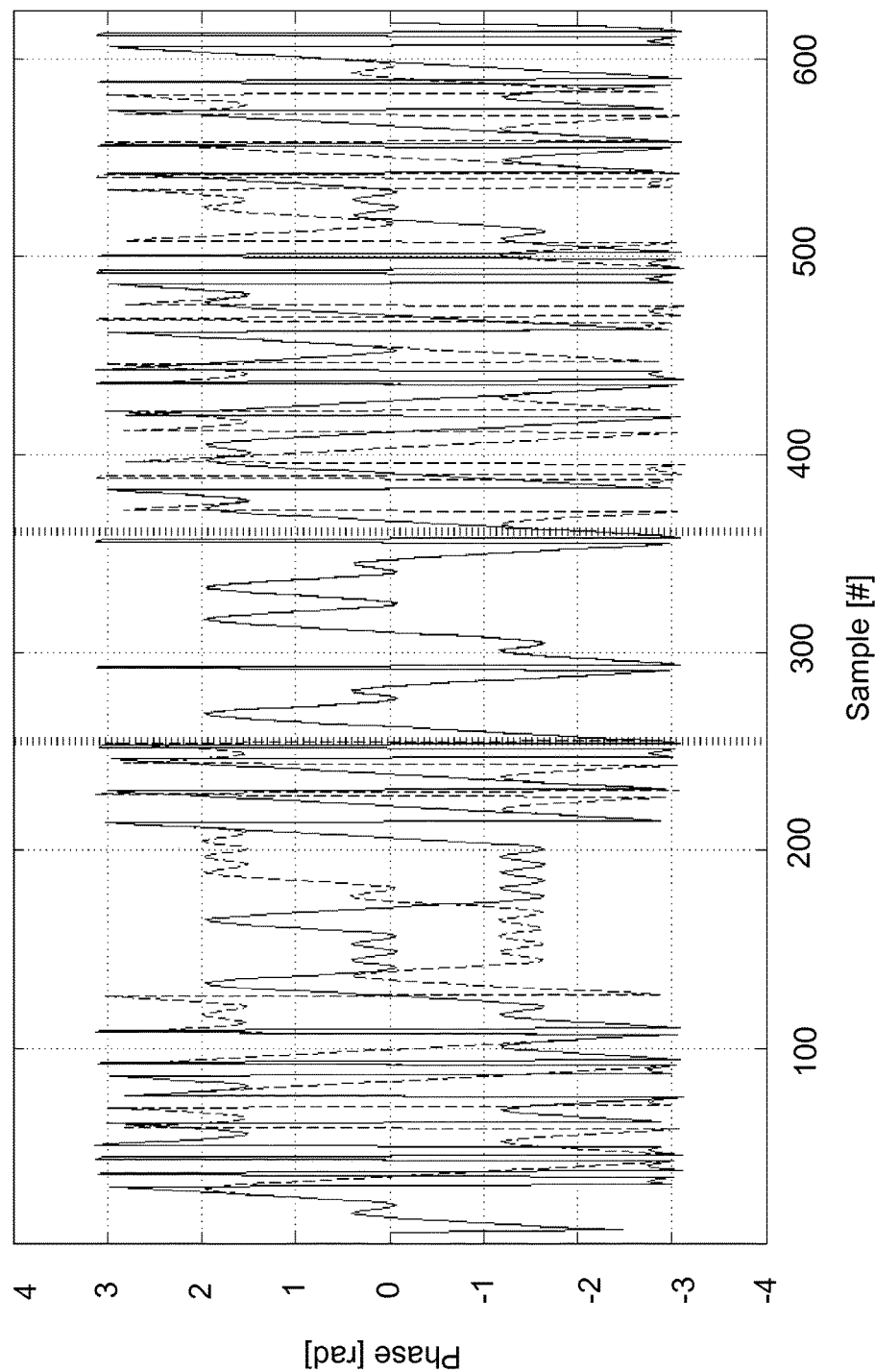
FIG. 3 shows a phase trajectory of two normal GSM bursts, aligned during the training sequence.

Relative changes in e.g. burst characteristics could be applied on a burst-by-burst basis. Assume for example that two different bursts are transmitted. Common to both bursts are a training sequence in the middle of the burst. It is further assumed that the transmitter 12 ensures that the phase trajectory during the known part to both transmitter 12 and receiver 10, 13, in this case the training sequence, is identical for the two transmissions. This is shown in FIG. 3. The x-axis of FIG. 3 represents the number of samples and the y-axis represents the phase measured in rad. The training sequence occurs roughly in-between the dotted vertical lines in the middle of the burst. The example provided is for a GSM normal burst, and since some level of inter-symbol interference is introduced already at the transmitter 12, there could be some corner effects from the random data on each side of the training sequence that will cause the phase to be impacted over a limited number of symbols close to the random data. I.e. the phase trajectory will not be identical over all 26 training sequence symbols, but to a large part of it (estimated by the vertical black dotted lines). FIG. 3 shows a phase trajectory of two normal GSM bursts, aligned during the training sequence (samples in-between the two vertical dotted lines). Oversampling of 4$x$ is assumed in FIG. 3.

Further assume the radio channel over which the two bursts are transmitted is stationary/close to stationary during the transmission. I.e. both bursts are experiencing the same/similar amplification/attenuation, phase shift and/or time shift. The second receiver 13 will in this case estimate a similar phase and amplitude variation of the signal from both transmissions.

Assume further that no change in phase between the transmissions is assumed to communicate a binary '0', while an experienced 180° phase shift would have communicated a binary '1'. Hence, apart from the reception of the burst itself to a first receiver, a superimposed bit is also transferred. This bit can either be received by the same first receiver 10, or a second receiver 13.

Figure 4:
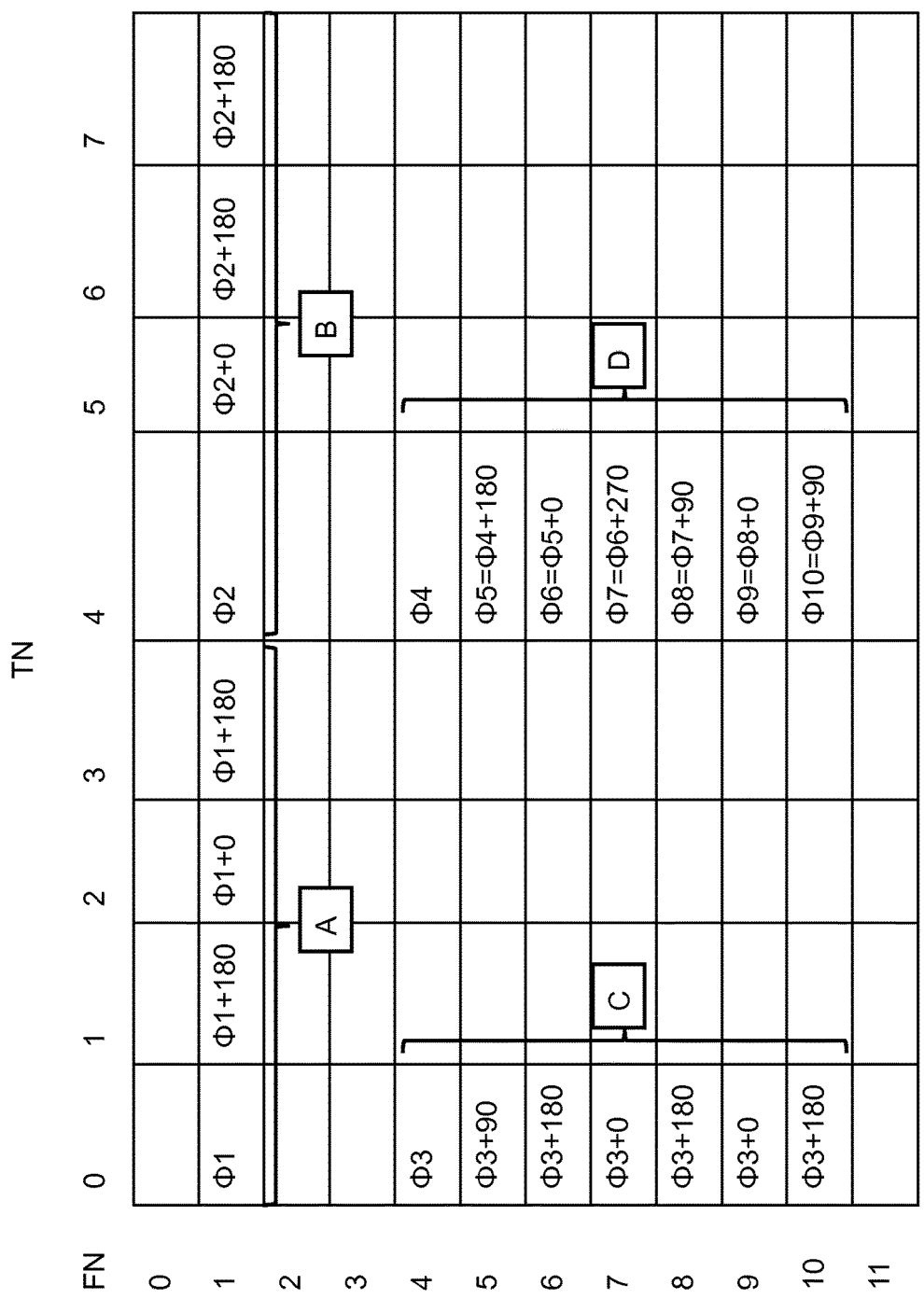
FIG. 4 shows the Time Division Multiple Access (TDMA) frame structure of a GSM channel.

Relative changes in burst characteristics need not be applied on a burst-by-burst basis, but a pre-determined burst could be used to (re-)set the phase and/or amplitude and/or time shift of the burst. The superimposed information carried by bursts following the first burst are defined relative to the reference burst until a second reference burst is received in which case all following bursts are defined relative to that one etc. This is illustrated in FIG. 4. FIG. 4 shows the TDMA frame structure of a GSM channel where the columns represent Timeslot Number (TN) and the rows represent Frame Number (FN). A phase is represented by the symbol φ in FIG. 4.

In example A in FIG. 4, four consecutive bursts are transmitted on TN 0-3 in TDMA frame number 1. A burst phase shift of either 0 or 180° is used to communicate information. The phase of the burst in TN 0 is used as reference, while the phase of the bursts in TN 1-3 is used to communicate the bit sequence '101' (following the assumption above).

In example B in FIG. 4, the phase of the burst in TN 4 is the reference, and the bursts in TN 5-7 carry the bit sequence '011'.

FIG. 4 shows examples of different definitions of reference phase on a GSM channel.

Figure 5:
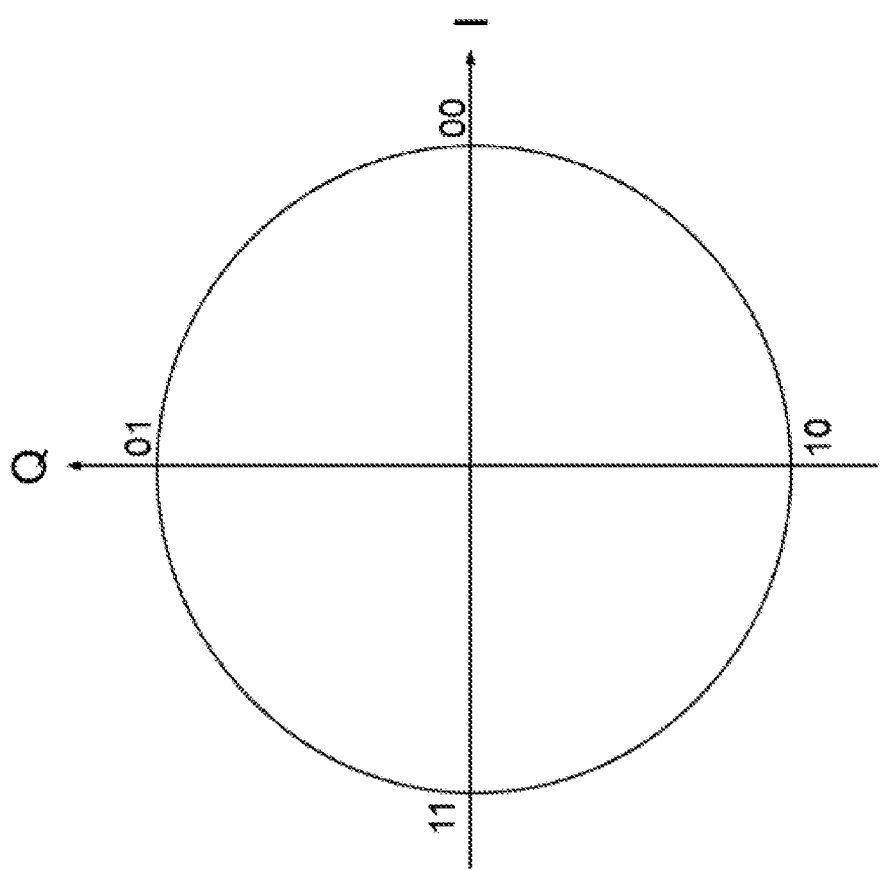
FIG. 5 shows a Four-state modulation based on the phase of the signal.

In example C in FIG. 4, the burst on TN 0 in TDMA frame 4 is providing the reference phase. Only phase variations are applied to the following bursts on the same timeslot (TN 0). In this example, a quaternary phase modulation is used, defined according to FIG. 5. E.g. a phase shift of 180° compared to the reference burst is defined as binary '11'. FIG. 5 shows a Four-state modulation based on the phase of the signal. If the bursts on TN 0 in TDMA frame 5-10 are detected to experience a phase shift compared to the reference burst of 90°, 180°, 0°, 180°, 0° and 180°, respectively, it can be assumed by the second receiver 13 that the superimposed information '011100110011' has been transmitted.

In example D in FIG. 4, the reference is defined to be the burst on TN 4 in the previous TDMA frame. The same quaternary phase modulation as in example C is assumed. The conveyed information is the bit sequence '110010010001'.

Since the burst phases conveying information are applied to an existing communication channel, this new low-rate channel is called a super-channel. The term super-channel emphasizes the fact that the embodiments herein create a new channel over an existing channel.

While the examples above all utilize phase modulation to create the super-channel, there are many other burst characteristics that can be utilized as well. In general, any burst characteristic that is not information-bearing to the first receiver 10 of the underlying channel can be used in order to transmit information to the second receiver 13, as long as the burst modifications are either transparent to the first receiver 10, or can be compensated for without significant impact to its performance. Examples of such characteristics include (but are not limited to):

Burst phase: as explained above.

The burst amplitude can be modulated to create a super channel with Amplitude Shift Keying (ASK). While the absolute burst amplitude does not carry information to the first receiver 10 of the underlying channel, it may have an impact on the performance of the link and/or system, since amplitude changes will impact the signal-to-noise ratio and the interference generated.

Burst timing changes can be used as an information bearer if the first receiver 10 of the underlying channel has sufficient means to synchronize to the signal (which is typically the case as long as the changes are within the synchronization window of the first receiver 10).

The frequency offset can be used to create a super channel with Frequency Shift Keying (FSK) if the first receiver 10 has sufficient means to correct the frequency error of the received signal (automatic frequency correction, AFC).

The time dispersion profile can be modulated by applying one of a set of Transmission (TX) filters prior to transmitting the signal. On time dispersive channels, the first receiver 10 of the underlying channel must have means to equalize the signal. The time dispersion is not information bearing to the first receiver 10 of the underlying channel, but may impact its performance. Care must be taken to assure that that the combined time dispersion created by the channel and the super channel modulation is not more than what the first receiver 10 can handle.

Combinations of the above. For instance, amplitude and phase changes of the burst can be combined to generate any QAM modulation on the super channel.

In addition, the application of differential modulation techniques such as differential phase modulation in the form of Differential BPSK, Differential QPSK or other well-known differential modulation techniques can advantageously be applied to the super-channel. For example, in ordinary differential phase modulation the information is carried by the phase difference between consecutive modulation symbols. It is straightforward to apply this idea to burst phases. In the super-channel, the information will be carried by the phase difference between two consecutive bursts phases.

Transmitter

Since the embodiments herein are based on relative changes in burst characteristics the transmitter 12 has an absolute knowledge of the burst characteristics in each transmission. Furthermore, a relative change is applied between bursts transmitted to convey information in a pre-determined manner to one or more receivers 10, 13. The pre-determined relative changes could for example be a change in the phase of the signal. Depending on the phase shift applied, different information bits are conveyed to the second receiver 13.

In its simplest form, the relative change to the burst characteristics is applied to a pre-determined part of the signal, known to the second receiver 13. The relative change is applied to the whole burst, but it is only during the part of the signal known to the second receiver 13 that the relative changes need to be well defined since it is only during this part of the burst that the information is conveyed. In for example GSM a training sequence is transmitted in each burst. The training sequence is assigned to the receiver and hence the second receiver 13 will know the training sequence it shall receive. Consequently the absolute phase of the signal during the training sequence needs to be controlled by the transmitter 12.

In order for each device 10, 13 receiving the bursts, where relative changes to the burst characteristics have been applied, to know how to interpret the relative changes applied to the burst, a re-occurring pre-determined reference of one or more bursts is transmitted. In for example GSM, a reference burst could be transmitted in the first frame of every 51-multiframe on TS0. Alternatively, a burst with a fixed mapping to the frame structure, such as the Synchronization Burst (SB) carried by the Synchronization CHannel (SCH), could be used. The reception of this burst will imply to the second receiver 13 that the burst was transmitted at reference phase zero, with no amplitude or time shifts applied.

Embodiments herein do not preclude that different reference signals can be used to convey the information of the radio channel with the changed characteristics called super-channel. The different reference signals could for example be the use of different training sequences and or modulation schemes, or any other modification that can be detected by the second receiver 13. In this case, the requirement on the transmitter 12 is not to follow the same phase trajectory between transmissions but to follow a pre-determined relation between the pre-determined signals. Assume for example in GSM that a Gaussian Minimum Shift Keying (GMSK) modulated burst using Training Sequence Code (TSC) zero (TSC0) and TSC4 is used to carry the information in example A in FIG. 4. TSC0 is further assumed to be transmitted during FN0 and FN2, while TSC2 is assumed to be transmitted during FN1 and FN3. The pre-determined relation mentioned above would for example imply that TSC0 and TSC4 should follow a pre-determined relative phase trajectory during the duration of the known training sequence part.

Receiver or Second Receiver

The second receiver 13 will have to determine the relative burst characteristics applied by the transmitter 12.

The receiver algorithms for the super-channel introduced in above will vary depending on the modulation technique used (ASK, FSK, QAM, etc.). The receiver technology shall be illustrated for the burst phase modulation described in above. A burst structure similar to that used in GSM is also assumed, with every burst containing a known training sequence as a midamble. The following sections describe low complexity maximum-likelihood detectors.

Baseband Model

Assuming that the received digital baseband signal has been sampled at the symbol rate. The received signal corresponding to the burst number m consists of N samples. There are $N_{tr}$ known training symbols $(s_n)_{n=0}^{N_{tr}-1}$ which are re-used in every burst, and at the second receiver 13 side the received signal is equal to (or can be well approximated by) a linearly modulated signal where the transmitted symbols have been rotated by an angle $\varphi$. The set of possible burst phases is denoted by $\wp$. For example if the four state rotation shown in FIG. 5 is used then $\wp = \{0°, 90°, 180°, 270°\}$. The discrete equivalent channel, comprising the transmit and receive filters, as well as the propagation medium, is modeled as a Finite Impulse Response (FIR) filter with L taps. The channel taps will be written as $(c \cdot h_k)_{k=0}^{L-1}$, where $h_0=1$. The factor c represents the channel from the point of view of the burst phase shifts. In other words, it represents the phase and amplitude distortions that the channel imparts on the information bearing burst phase shifts of the super-channel.

The received signal corresponding to burst number m is denoted by $(y_{m,n})_{n=0}^{N-1}$. The synchronization position $n_0$ indicates the start of the training sequence. With this notation, the received samples for the m-th burst and over the training sequence, may be written in the following form.

$$y_{m,n+n_0} = c \cdot \Sigma_{k=0}^L h_k s_{n-k} e^{j(n-k)\varphi} e^{j\theta_m} + w_{m,n}, n=L, \ldots, N_{tr} \quad (1)$$

The angle $\theta_m$ in (1) is the information bearing phase shift and $w_{m,n}$ are white Gaussian noise samples with variance $\sigma^2$. The term c is complex-valued. It can be determined if the phase $\theta_{m_0}$ at an arbitrary but fixed burst $m_0$ is known at the second receiver 13. In this case, one can use the following model to determine c and $(h_k)_{k=1}^{L-1}$. ($h_0=1$ does not need to be estimated.)

$$e^{-j\theta_{m0}} \cdot y_{m,0,n+n_0} = c \cdot \Sigma_{k=0}^L h_k s_{n-k} e^{j(n-k)\varphi} + w_{m0,n},$$
$$n=L, \ldots, N_{tr} \quad (2)$$

In one embodiment, training bursts with a known phase shift and the least squares method are used, together with (2), in order to estimate the channel parameters c and $(h_k)_{k=1}^{L-1}$. Note that the only unknowns in (2) are c and $(h_k)_{k=1}^{L-1}$ and the noise, so that least squares or other standard linear regression techniques can be employed to estimate c and $(h_k)_{k=1}^{L-1}$.

In order to simplify the mathematical expression (1) we introduce the notation $$r_n = \Sigma_{k=0}^L h_{k=0} s_{n-k} e^{j(n-k)\varphi} \quad (3)$$

Note that the expression (3) does not depend upon the burst number, since the same training sequence is used in every burst. With this notation, (1) simplifies to $$y_{m,n+n_0} = c \cdot r_n \cdot e^{j\theta_m} + w_{m,n}, n=L, \ldots N_{tr}. \quad (4)$$

This expression can be further written in vector form. This will be convenient for the development of the detectors below. Define the vectors $$\vec{r} = [r_L, \ldots, r_{N_{tr}}]^T, \vec{w}_m = [w_{m,L}, \ldots, w_{m,N_{tr}}]^T,$$
$$\vec{y}_m = [y_{m,L+n_0}, \ldots, y_{m,N_{tr}+n_0}]^T$$

where the superscript T denotes transpose. Then (4) becomes simply $$\vec{y}_m = c \cdot e^{j\theta_m} \cdot \vec{r} + \vec{w}_m \quad (5)$$

The baseband model (5) in vector notation is the basic model for the super-channel.

Coherent Detection

In this section it shall be assumed that training bursts with known burst phases are available and that the channel parameter c has been estimated. A method to perform the estimation was outlined above. In this case, it follows from (5) that the Probability Density Function (PDF) of the received samples, conditioned on the channel and the burst phase shift is given by $$p(\vec{y}_m | c, \theta_m) = \frac{1}{(\sigma\pi)^{2(N-L+1)}} \exp\left(\frac{(\vec{y}_m - ce^{j\theta_m} \cdot r)^H (\vec{y}_m - c \cdot e^{j\theta_m} \vec{r})}{\sigma^2}\right) \quad (6)$$

Where the superscript H denotes the Hermitian transpose. Then $$\log p(\vec{y}_m | c, \theta_m) = -(\vec{y}_m - c \cdot e^{j\theta_m} \cdot \vec{r})^H \cdot (\vec{y}_m - c \cdot e^{j\theta_m} \cdot \vec{r}) + \text{terms independent of } \theta_m. \quad (7)$$

Hence, the maximum likelihood estimate $\hat{\theta}_m$ for the information bearing burst phase shift $\theta_m$ is $$\hat{\theta}_m = \arg\min_{\theta \in \wp} \{(\vec{y}_m - c \cdot e^{j\theta} \cdot \vec{r})^H \cdot (\vec{y}_m - c \cdot e^{j\theta} \cdot \vec{r})\}. \quad (8)$$

Non-Coherent Detection

In this section it shall be assumed that no training bursts are available and therefore the channel parameter c is not available at the receiver 10, 13. In this case, the baseband model $$y_{m,n+n_0} = c \cdot \Sigma_{k=0}^L h_k s_{n-k} e^{j(n-k)\varphi} + w_{m,n}, n=L, \ldots, N_{tr}. \quad (9)$$

is used in order to estimate the channel parameters c and $(h_k)_{k=1}^{L-1}$. $h_0=1$ does not need to be estimated. The value of c obtained in this fashion is ambiguous because it includes the information bearing burst phase shift. However, differential detection is still possible. That is, it is possible to determine the relative phase shift between two bursts. In order to perform differential detection, it is necessary to collect two received bursts. It shall be assumed that neither the channel parameters c and $(h_k)_{k=1}^{L-1}$ nor the synchronization position $n_0$ change significantly from burst to burst and can be considered constant. The following baseband model will be employed.

$$y_{m,n+n_0} = c \cdot r_n e^{i\theta_m} + w_{m,n}, n = L, \ldots, N_{tr} \text{ [m-th burst]} \quad (10)$$

$$y_{m+1,n+n_0} = c \cdot r_n e^{i\theta_m + \theta_{m+1}} + w_{m+1,n}, n = L, \ldots, N_{tr} \text{ [(m+1)-th burst]} \quad (11)$$

The objective of the detector is to estimate the information bearing relative phase shift $\theta_{+1}$.

Using the notation introduced earlier, define $$\vec{y} = \begin{bmatrix} \vec{y_m} \\ \vec{y_{m+1}} \end{bmatrix},$$

$$\vec{u} = \begin{bmatrix} e^{i\theta_m} \cdot \vec{r} \\ e^{i(\theta_m + \theta_{m+1})} \cdot \vec{r} \end{bmatrix} \text{ and } \vec{w} = \begin{bmatrix} \vec{w_m} \\ \vec{w_{m+1}} \end{bmatrix}.$$

Using this notation, the model (10)-(11) can be re-written as $$\vec{y} = \vec{u} \cdot c + \vec{w}. \quad (12)$$

We shall assume c that is a Gaussian random variable with zero mean and variance $\rho^2$, independent of the noise. The actual value of $\rho^2$ need not be estimated. It follows from (12) that $$Q = \text{cov}(\vec{y}) = E[\vec{y} \cdot \vec{y}^H] = \rho^2 \vec{u} \cdot \vec{u}^H + \sigma^2 I \quad (13)$$

It follows that the pdf of $\vec{y}$ conditioned on $\theta_m, \theta_{m+1}$ is $$p(\vec{y} | \theta_m, \theta_{m+1}) = \frac{\det(Q^{-1})}{\pi^{2(N-L+1)}} \exp(-\vec{y}^H \cdot Q^{-1} \cdot \vec{y}) \quad (14)$$

The Sherman-Morrison formula states that given an invertible matrix A and a vector v, the following equality holds $$(A + \vec{u} \cdot \vec{u}^H)^{-1} = A^{-1} - \frac{A^{-1} \vec{u} \vec{u}^H A^{-1}}{1 + \vec{u}^H A^{-1} \vec{u}}. \quad (15)$$

Applying this formula to (13)

$$Q^{-1} = \sigma^{-2}\left(I - \frac{\sigma^{-2}\rho^2 \vec{u} \vec{u}^H}{1 + \sigma^{-2}\rho^2 \vec{u}^H \vec{u}}\right) = \sigma^{-2}\left(I - \frac{\sigma^{-2}\rho^2 \vec{u}\vec{u}^H}{1 + \sigma^{-2}\rho^2 2\|\vec{r}\|_2^2}\right). \quad (16)$$

Here $\|\vec{r}\|_2$ denotes the second norm of $\vec{r}$. Setting $$\beta = \frac{\sigma^{-2}\rho^2}{1 + \sigma^{-2}2\|\vec{r}\|_2^2}, \quad (17)$$

(16) becomes $$Q^{-1} = \sigma^{-2}(I - \beta \vec{u} \cdot \vec{u}^H). \quad (18)$$

Note that $$\det(I - \beta \vec{u} \cdot \vec{u}^H) = \det(I - \beta \vec{u}^H \cdot \vec{u}) = 1 - \beta 2\|\vec{r}\|_2^2. \quad (19)$$

Therefore $\det(Q^{-1})$ is independent of $\theta_m, \theta_{m+1}$. Hence $$\log p(\vec{y} | \theta_m, \theta_{m+1}) = -\vec{y}^H \cdot Q^{-1} \cdot \vec{y} + \text{terms independent of } \theta_m, \theta_{m+1}. \quad (20)$$

Using (18) it can be seen that $$\log p(\vec{y} | \theta_m, \theta_{m+1}) = \beta \cdot \vec{y}^H \cdot \vec{u} \cdot \vec{u}^H \cdot \vec{y} + \text{terms independent of } \theta_m, \theta_{m+1}. \quad (21)$$

Direct computation shows that $$\vec{u} \cdot \vec{u}^H = \begin{bmatrix} \vec{r} \cdot \vec{r}^H & e^{-j\theta_{m+1}} \cdot \vec{r} \cdot \vec{r}^H \\ e^{j\theta_{m+1}} \cdot \vec{r} \cdot \vec{r}^H & \vec{r} \cdot \vec{r}^H \end{bmatrix}. \quad (22)$$

This shows that $\log p(\vec{y} | \theta_m, \theta_{m+1})$ is independent of $\theta_m$. Moreover, from (21) follows that the maximum likelihood estimate of $\theta_{m+1}$ is $$\hat{\theta}_{m+1} = \arg\max_{\theta \in p} \left\{ \vec{y}^H \begin{bmatrix} \vec{r} \cdot \vec{r}^H & e^{-j\theta} \cdot \vec{r} \cdot \vec{r}^H \\ e^{j\theta} \cdot \vec{r} \cdot \vec{r}^H & \vec{r} \cdot \vec{r}^H \end{bmatrix} \cdot \vec{y} \right\}. \quad (23)$$

Further Extensions

In case the transmitter 12 is using different reference signals (see above) a detection of which reference signal that has been used is needed at the second receiver. Following the example provided above using different reference signals means that the transmitter 12 would have to blindly detect between TSC0 and TSC4 for every burst. The extension of the coherent detector to this case is straightforward, since the detection of the information bearing burst phase shift is performed per burst. It is also possible to extend the non-coherent detector to the case of different training sequences and/or different rotations. The case of different rotations is relevant when a solution according to embodiments herein is applied to GSM because the rotation angle can change from burst to burst when the modulation is changed (e.g. from GSMK to 8PSK). The rotation angle can be blindly detected on a burst basis, this is well known in the art. Therefore, in what follows it is assumed that the rotation angles are known. Assume that the training sequence for the (m+1)-th burst is $(t_n)_{n=0}^{N_{tr}-1}$ and the rotation angle is $\delta$. However, it is assumed, as before, that neither the channel nor the synchronization position changes significantly between the bursts. Define $$p_n = \sum_{k=0}^{L} h_k t_{n-k} e^{j(n-k)\delta}, \quad (24)$$

$$y_{m,n+n_0} = c \cdot r_n e^{i\theta_m} + w_{m,n}, n = L, \ldots, N_{tr}, \text{ [m-th burst]}, \quad (25)$$

$$y_{m+1,n+n_0} = c \cdot p_n e^{i(\theta_m + \theta_{m+1})} + w_{m+1,n}, \quad (26)$$
$$n = L, \ldots, N_{tr}, \text{ [(m+1)-th burst]},$$

$$\vec{p} = [p_L, \ldots, p_{N_{tr}}]^T, \quad (27)$$

$$\vec{u} = \begin{bmatrix} e^{i\theta_m} \cdot \vec{r} \\ e^{i(\theta_m + \theta_{m+1})} \cdot \vec{p} \end{bmatrix}. \quad (28)$$

The baseband model for two received bursts becomes $$\vec{y} = \vec{u} \cdot c + \vec{w}. \quad (29)$$

Note that $\vec{u}^H \cdot \vec{u} = \|r\|_2^2 + \|p\|_2^2$ is independent of $\theta_m$, $\theta_{m+1}$, and that $$\vec{u} \cdot \vec{u}^H = \begin{bmatrix} \vec{r} \cdot \vec{r}^H & e^{-j\theta_{m+1}} \cdot \vec{r} \cdot \vec{p}^H \\ e^{j\theta_{m+1}} \cdot \vec{p} \cdot \vec{r}^H & \vec{p} \cdot \vec{p}^H \end{bmatrix}, \quad (30)$$

is independent of $\theta_{m+1}$. The same arguments used above show that the maximum likelihood estimator of the information bearing phase $\theta_{m+1}$ is $$\hat{\theta}_{m+1} = \mathrm{argmax}_{\theta \in p} \left\{ \vec{y}^H \begin{bmatrix} \vec{r} \cdot \vec{r}^H & e^{-j\theta} \cdot \vec{r} \cdot \vec{p}^H \\ e^{j\theta} \cdot \vec{p} \cdot \vec{r}^H & \vec{p} \cdot \vec{p}^H \end{bmatrix} \cdot \vec{y} \right\}. \quad (31)$$

Other Aspects

By using the techniques explained above, a super channel is created. The super channel can be seen as a robust low bitrate physical channel. On top of this channel, well-known techniques to improve robustness can be applied, such as channel coding and interleaving. Furthermore, any protocol layer functionality can be added to the channel, including both novel designs and re-use of existing protocol layer functionality from existing systems.

Figure 6:
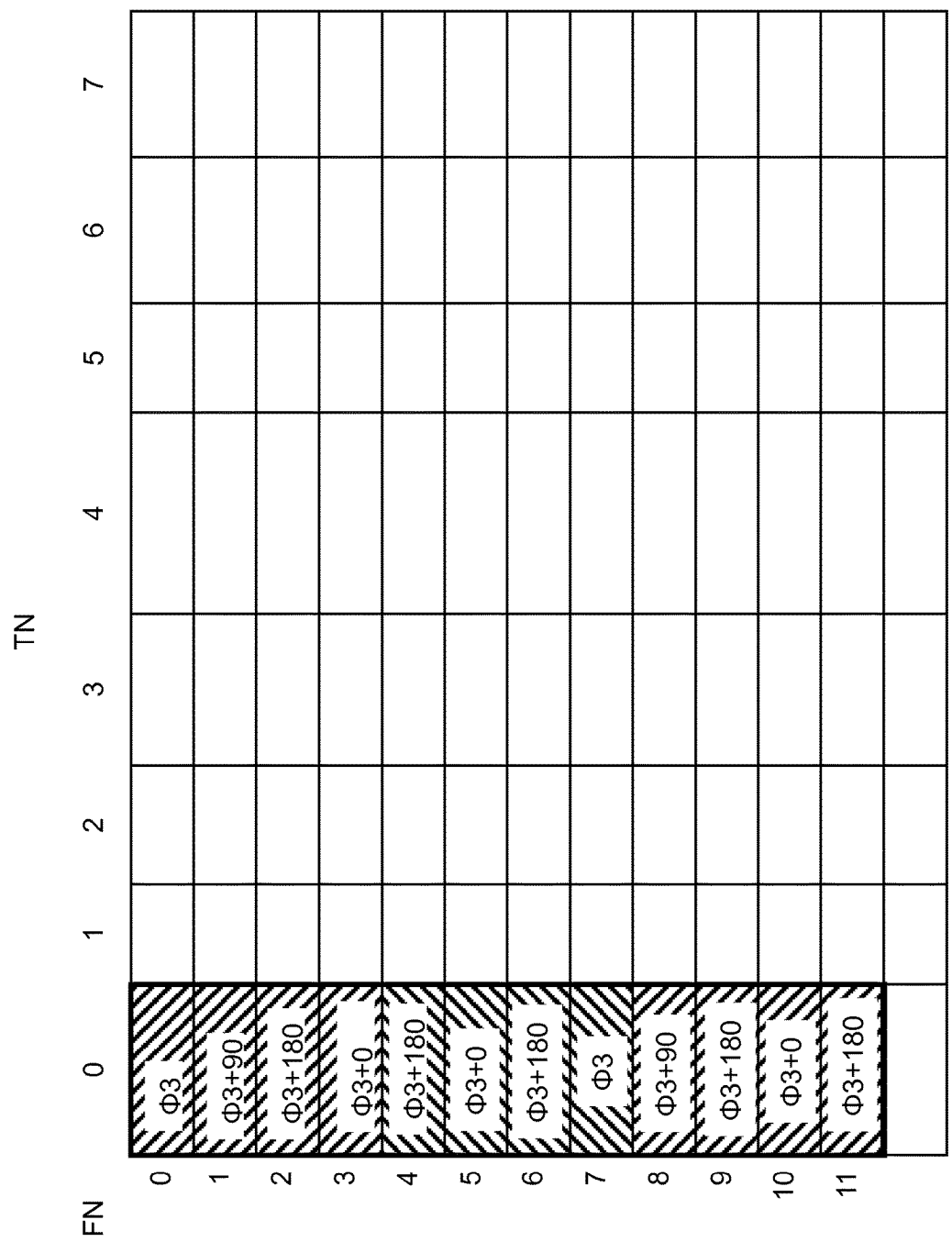
FIG. 6 shows a super-channel frame structure.

Also on a Medium Access Control (MAC) layer design, the super-channel provides a flexible design. For example the frame structure could follow either the transmission structure of the underlying system, or defining a new structure used by the super-channel. In GSM for example, the super-channel frame structure could be defined in eight separate timeslots spanning for example twelve TDMA frames, as shown in FIG. 6 by a bold black line on TN zero. The underlying frame structure of GSM where a frame is transmitted over one TN and four consecutive TDMA FNs is shown with varying slanted +45/−45 degree pattern. FIG. 6 shows examples of the frame structure for the super-channel. The rows in FIG. 6 represent FNs and the columns represent TNs.

Applications to GSM

General on GSM Bursts

Figure 7:
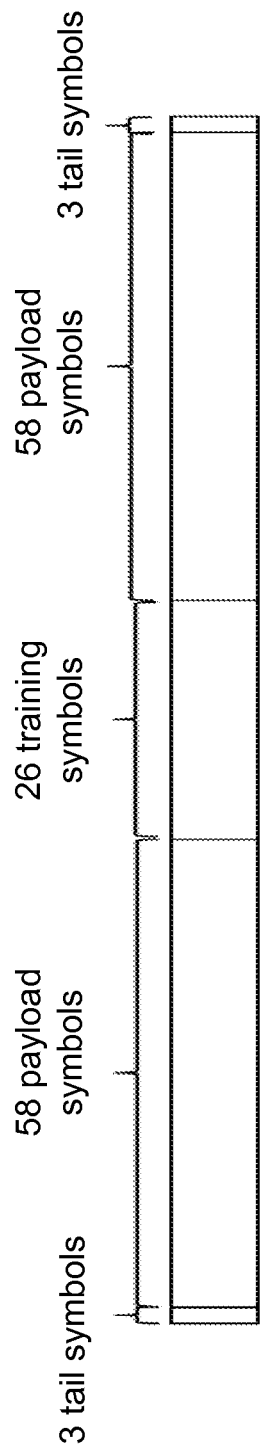
FIG. 7 shows a normal burst format at normal symbol rate.

A GSM carrier is divided into timeslots. Each timeslot can carry one burst. There are different burst types supported. The most common burst type carrying user traffic is a normal burst, each being 15/26 ms long. Each normal burst contains tail symbols, payload symbols and training symbols, as shown in FIG. 7. FIG. 7 shows a normal burst format at normal symbol rate. In FIG. 7, the example embodiments of the burst comprises 3 tail symbols at one end of the burst, 28 payload symbols, 26 training symbols, 58 payload symbols and 3 tail symbols at the other end of the burst.

When a dedicated traffic channel is set up for a user, the assigned training sequence (assigned during the set up phase) shall be used when communicating with the wireless device.

A special TSC requirement applies on the Broadcast Control CHannel (BCCH) carrier of the GSM cell, and especially on TS0 where all normal bursts need to use a training sequence corresponding to the Base Station Identification Code (BSIC). Furthermore, a BCCH carrier in GSM needs to be constantly transmitting, irrespective if there is any information scheduled for transmission. Hence, the super-channel can rely on a low bit-rate utilizing all bursts transmitted on the BCCH carrier.

There are also other burst types transmitted in the DL on the BCCH carrier on TS0, such as Frequency correction Burst (FB) and Synchronization Bursts (SB), carried by the Frequency Correction CHannel (FCCH) and Synchronization CHannel (SCH) respectively.

Examples of Applications

Examples of applications of a super channel in GSM are described below. The applications serve as an example and do not limit the super-channel to be applicable for other purposes.

Robust Broadcast Channels and/or Common Control Channels for Cellular IoT

A super channel can be created on the BCCH carrier in a GSM cell by e.g. phase shifting. The robust super channel can be used e.g. for cellular IoT devices that require extended coverage due to e.g. penetration loss in buildings.

The super channel may be used for creating a robust BCCH for broadcasting of system information. The super channel may also be used for creating a robust SCH that can be used by the devices to derive the TDMA frame numbering of the cell, and for creating a robust Common Control CHannel (CCCH) for paging, access grant etc.

Downlink Traffic Channel for Cellular IoT

A super channel can be created on a non-BCCH carrier by e.g. phase shifting. The super channel can be used as a robust traffic channel to a cellular IoT device.

Fast Feedback Channel

A super channel can be created on a downlink carrier carrying traffic channels. The super channel can be used to send feedback to control the transmission in the reverse direction.

Acknowledgment/Negative Acknowledgement (Ack/Nack) reporting for uplink packet data transfers.

Uplink power control for packet data transfers or circuit switched speech channels.

Radio Resource Managements

A super-channel can be created on a downlink carrier, to indicate to receiving devices parameters relating to Radio Resource Management (RRM). This can for example be the assignment of UL transmission opportunities in coming radio block periods.

Performance Simulations for GSM Application

To demonstrate the performance of the super channel, an application to GSM has been implemented in a link simulator. The simulator models a GSM carrier continuously transmitting GMSK modulated bursts. A super channel is generated by applying relative phase shifts to the bursts. A phase shift of +90° signals a '0' while a phase shift of −90° signals a '1'.

On top of the super channel, a convolutional code is used for error correction. The encoder encodes blocks of information bits into blocks of code bits, a k a code words. Two different convolutional codes are demonstrated, one having an information block size of 130 bits and a code rate of R=1/2, and the other having an information block size of 194 bits and a code rate of R=1/3.

A white Gaussian noise is added to the signal to model the thermal noise in the second receiver 13. The signal is also subject to a continuous phase drift, which is included to model a frequency error in the second receiver of 50 Hz—a value that is considered pessimistic for typical GSM Mobile Station (MS) receivers.

The phase shifts are detected in the second receiver 13 by receiving and correlating the training sequence of consecutive bursts. A simple frequency error compensation algorithm is also implemented.

Figure 8:
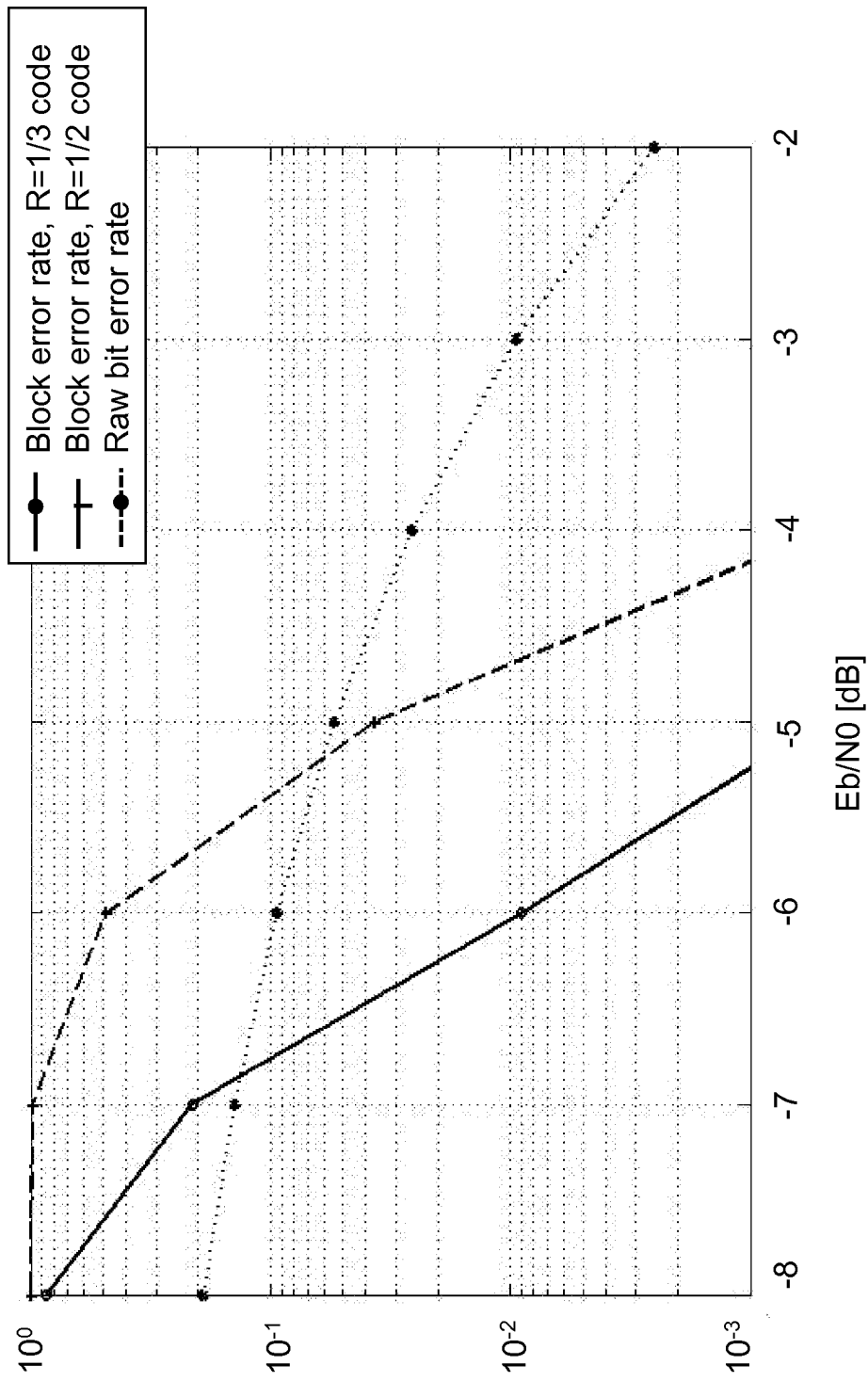
FIG. 8 shows a simulated link performance of a super channel on a GSM carrier.

The receiver performance of the second receiver 13 is simulated at a range of signal-to-noise ratios. The result is shown in FIG. 8. The x-axis of FIG. 8 represents Eb/N0 measured in decibel (dB).

The dotted line shows the raw bit error rate, the probability that a bit (i.e., a phase shift) on the super channel is erroneously detected.

The solid line and the dashed line show the block error rate, the probability that an information block contains erroneous bits after channel decoding. The solid line corresponds to the R=1/3 code while the dashed line corresponds to the R=1/2 code. For instance, a block error rate of slightly less than 1% is achieved for the R=1/3 code at a signal-to-noise ratio of −6 dB.

This shows that this application of the super channel is very robust in presence of noise. FIG. 8 shows a simulated link performance of a super channel on a GSM carrier.

Embodiments herein let relative changes in characteristics such as burst characteristics that are transparent to the first receiver carry information to the second receiver.

A known part of the burst, e.g. a training sequence, is utilized by the second receiver 13 to detect the changes.

The changes will be interpretable by the second receiver 13 as long as changes caused by the channel and/or transmitter/receiver impairments happen at a slower pace, or can be predicted, than changes introduced by the transmitter.

The method actions in the transmitter 12, exemplified as the radio base station 12 in the figures, for transmitting a signal such as a reference signal or a training sequence according to some embodiments will now be described with reference to a flowchart depicted in FIG. 9. The transmitter 12 may be a radio base station and the second receiver 13 is a wireless device, or the transmitter 12 may be a wireless device and the second receiver 13 is a radio base station, or the transmitter 12 and the second receiver 13 may be wireless devices. The first receiver 10 may not be the same as the second receiver 13, or the first receiver 10 and the second receiver 13 may be the same receiver. The method in FIG. 9 comprises at least some of the following action steps, which steps may be performed in any suitable order than described below:

Action 901.

This action corresponds to action 201 in FIG. 2. The transmitter 12 determines change or changes to a signal characteristic/s of a signal for carrying information to the second receiver 13, e.g. the transmitter 12 determines changes to signal characteristics for the second receiver 13. The signal is intended for the first receiver 10. The change of the characteristic is transparent to a first receiver 10 and carries information to a second receiver 13.

Action 902.

This action corresponds to action 202 in FIG. 2. The transmitter 12 applies the determined change or changes to the signal characteristic/s and transmits the signal to the first receiver 10 and the second receiver 13. The change may be applied to the whole signal and it is transparent to the first receiver 10.

The determined change of the characteristic may be transmitted in a super channel to the second receiver 13, and the super channel may overlay another channel in which the information is transmitted to the second receiver 13.

The transmitter 12 may transmit, to the second receiver 13, a configuration for receiving additional information. In other words, the transmitter 12 configures the second receiver 13 for receiving additional information. The configuration may comprise information regarding a channel carrying the signal. The information may comprise at least one of a radio frequency, a set of timeslots used, a training sequence code and modulation used, information regarding how the additional information is mapped to the change in the signal characteristics.

The signal may be a burst in the wireless communication network 100 which uses GSM or which uses a system which has evolved from GSM, or the signal may be a packet in the wireless communication network 100 which uses WiFi.

The transmitter 12 may have knowledge about an absolute characteristic of the signal. The change of the characteristic may be a change relative to a reference signal. The reference signal may be a previously transmitted signal. The change of the characteristic may be at least one of a changed amplitude, a changed phase and a changed time shift.

The method actions in the second receiver 13, exemplified as the second wireless device 13 in the figures above, for retrieving information of a signal such as a reference signal or a training sequence according to some embodiments will now be described with reference to a flowchart depicted in FIG. 10. The transmitter 12 may be a radio base station and the second receiver 13 may be a wireless device, or the transmitter 12 may be a wireless device and the second receiver 13 may be a radio base station, or the transmitter 12 and the second receiver 13 may be wireless devices. The first receiver 10 may not be the same as the second receiver 13, or the first receiver 10 and the second receiver 13 may be the same receiver.

The method depicted in FIG. 10 comprises at least some of the following action steps, which steps may be performed in any suitable order than described below:

Action 1001.

This action corresponds to action 202 in FIG. 2. The second receiver 13 receives the signal from the transmitter 12. This may also be described as the second receiver 13 receives a signal with an applied change of a characteristic from a transmitter 12. The change of the characteristic is transparent to a first receiver 11 and carries information to the second receiver 13.

Action 1002.

This action corresponds to action 203 in FIG. 2. The second receiver 13 utilizes known or stored characteristic/s to determine the change or the relative change in the characteristic/s of the signal, e.g. the second receiver 13 utilizes known reference signal characteristics to determine changed signal characteristic/s. The second receiver 13 detects the change of the characteristic of the signal by utilizing a reference signal. The second receiver 13 may detect which reference signal that has been used by the transmitter 12.

Action 1003.

This action corresponds to action 203 in FIG. 2. The second receiver 13 then retrieves the information based on the determined changed characteristic/s.

The information may be to the second receiver 13 and is carried by the signal based on the detected change of the characteristic. After the second receiver 13 has retrieved the information, for example determined a 180 degree phase shift, which means a binary '0' has been transmitted, then it may discard the burst, unless it has the role of the first receiver 10 that is also interested in the "underlying" information, in which case a channel estimation of the propagation channel and equalization of the information, as per legacy operation, is performed. The second receiver 13 may receive, from the transmitter 12, a configuration for receiving additional information. The configuration may comprise information regarding a channel carrying the signal. The information may comprise at least one of a radio frequency, a set of timeslots used, a training sequence code and modulation used, information regarding how the additional information is mapped to the change in the signal characteristics.

The second receiver 13 may discard the information intended for the first receiver 10 in the signal if the second receiver 13 is not the same as the first receiver 10. The second receiver 13 may detect the information in the signal intended for the first receiver 10 if the second receiver 13 is the same as the first receiver 10. Using other words, the second receiver 13 may discard the signal if the second receiver 13 does not have a role of a first receiver, and may perform channel estimation and equalization if the second receiver 13 has a role of the first receiver 10.

The change of the characteristic may be a change relative to a reference signal. The reference signal is a previously received signal.

The change of the characteristic may be at least one of a changed amplitude, a changed phase and a changed time shift.

The signal may be a burst in the wireless communication network 100 which uses GSM or which uses a system which has evolved from GSM, or the signal is a packet in the wireless communication network 100 which uses WiFi.

Figure 11:
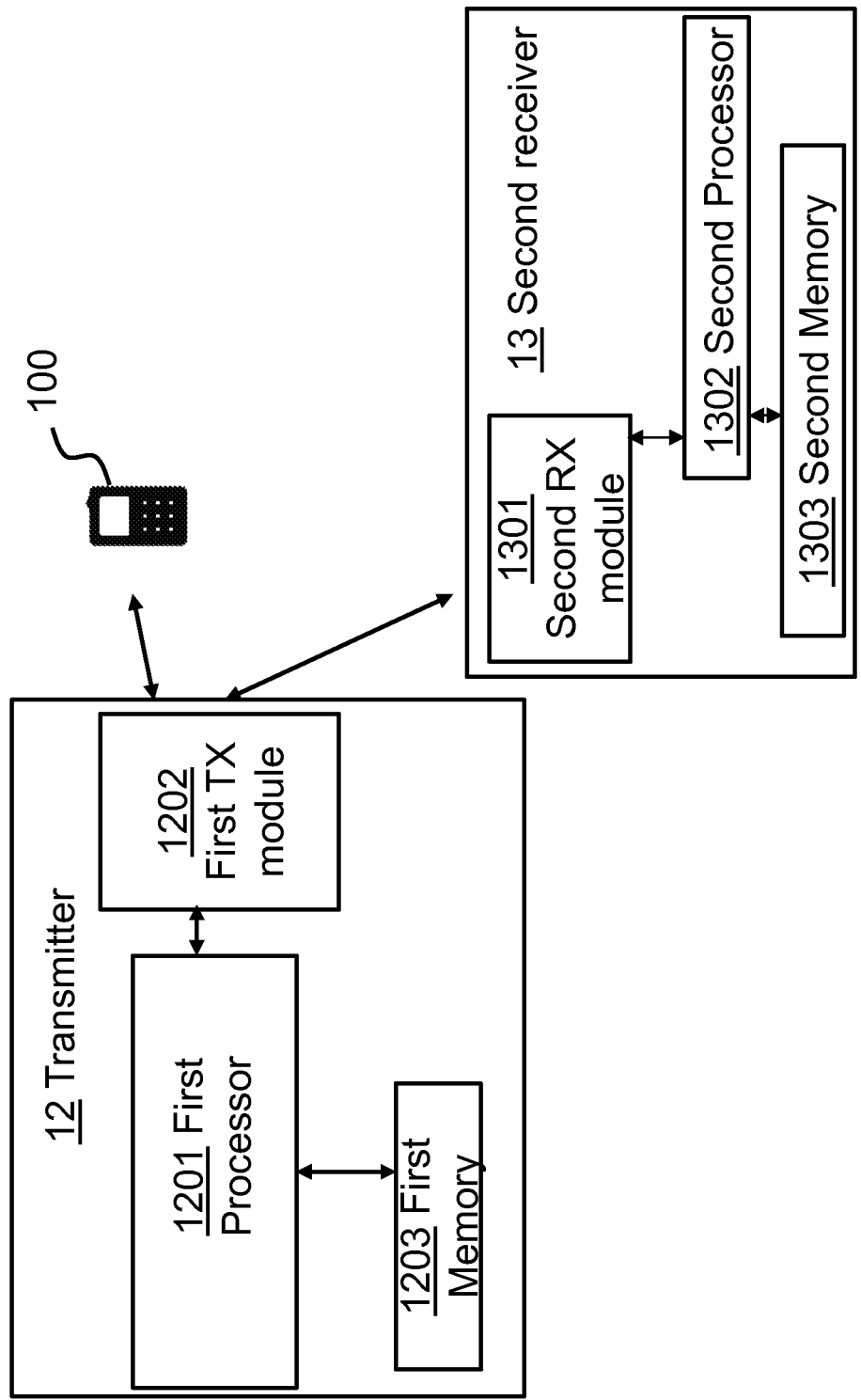
FIG. 11 illustrates a transmitter and a second receiver.

In order to perform the method a transmitter 12 and a second receiver 13 is provided as illustrated in FIG. 11 that are configured to perform the method actions herein.

The transmitter 12 may comprise a first processor 1201 or first processing means configured to determine a change or a relative change in a signal characteristic or characteristics of a signal for carrying information to the second receiver 13. The transmitter 12 may e.g. comprise a first determining module. Furthermore, the transmitter 12 may comprise a first transmitter module (TX) 1202 in a first transmitter/receiver (RX) module e.g. a transceiver, which first TX 1202 is configured to apply the change or changes to the signal characteristic/s and transmit the signal to the second receiver 13. The transmitter 12 further comprises a first memory 1203. The first memory 1203 comprises one or more units to be used to store data on, such as characteristics, training sequences, applications to perform the methods disclosed herein being executed, and similar.

For example, the transmitter 12 is configured to, e.g. by means of the first processor 1201, determine a change of a characteristic of a signal. The change of the characteristic is transparent to a first receiver 10 and carries information to a second receiver 13. The first processor 1201 is further configured to, e.g. by means of the first processor 1201, apply the determined change of the characteristic to the signal.

The transmitter 12 is configured to, e.g. by means of the first transmitter module 1202, transmit the signal with the applied change to the first receiver 10 and the second receiver 13. The first transmitter module 1202 may also be referred to as a first transmitter unit, a first transmitter means, a first transmitter circuit, first means for transmitting, fourth first output unit etc. The first transmitter module 1108 may be a transmitter, a transceiver etc. The first transmitter module 1202 may be a wireless transmitter of the transmitter 12 of a wireless or fixed communications system.

The transmitter 12 may be further configured to have knowledge about an absolute characteristic of the signal. The change of the characteristic may be a change relative to a reference signal. The reference signal may be a previously transmitted signal. The change of the characteristic may be at least one of a changed amplitude, a changed phase and a changed time shift.

The transmitter 12 may be being further configured to transmit, e.g. by means of the first transmitter module 1202, to the second receiver 13, a configuration for receiving additional information. The configuration may comprise information regarding a channel carrying the signal, which information comprises at least one of a radio frequency, a set of timeslots used, a training sequence code and modulation used, information regarding how the additional information is mapped to the change in the signal characteristics.

The transmitter 12 may be further configured to, e.g. by means of the first transmitter module 1202, transmit the signal with the applied change to the first receiver 10.

The determined change of the characteristic may be transmitted in a super channel to the second receiver 13, and the super channel may overlay another channel in which the information is transmitted to the second receiver 13.

The signal may be a burst in the wireless communication network 10) which uses GSM or which uses a system which has evolved from GSM, or the signal is a packet in the wireless communication network 100 which uses WiFi.

The transmitter 12 may be a radio base station and the second receiver 13 may be a wireless device, or the transmitter 12 may be a wireless device and the second receiver 13 may be a radio base station, or the transmitter 12 and the second receiver 13 may both be wireless devices.

The first receiver 10 may not be the same as the second receiver 13, or the first receiver 10 and the second receiver 13 may be the same receiver.

Figure 9:
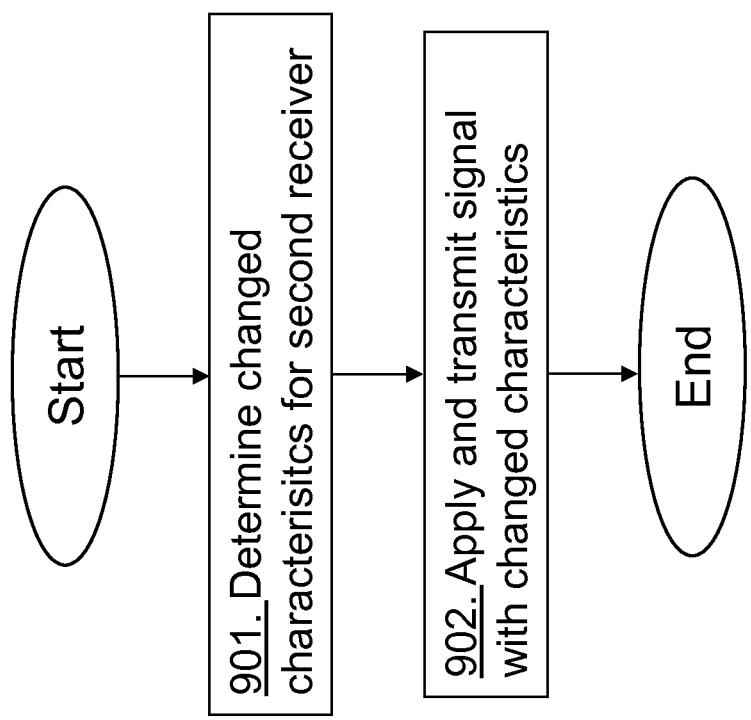
FIG. 9 is a flow chart depicting method actions in the transmitter.

A first computer program may comprising instructions which, when executed on at least one processor (e.g. the first processor 1201), cause the at least one processor to carry out the method as described in FIG. 9. A first carrier may comprise the first computer program, and the first carrier may be one of an electronic signal, optical signal, radio signal or computer readable storage medium.

The second receiver 13 may comprise a second receiver module (RX) 1301 configured to receive the signal from the transmitter 12. The second receiver 13 may further comprise a second processor 1302 or processing means configured to utilize known or stored characteristic/s to determine the change or the relative change in the characteristic/s of the signal, e.g. the second receiver 13 may comprise a second determining module configured for that. The second processor 1302 may further be configured to retrieve the information based on the determined changed characteristic/s, e.g. the second receiver 13 may comprise a second retrieving module. The receiver 13 further comprises a second memory 1303. The second memory 1303 comprises one or more units to be used to store data on, such as characteristics, training sequences, channel estimates, applications to perform the methods disclosed herein being executed, and similar.

For example, the second receiver 13 for retrieving information carried by a signal in a wireless communication network, may be configured to, e.g. by means of the second receiver module 1301, receive a signal with an applied change of a characteristic from the transmitter 12. The change of the characteristic is transparent to a first receiver 10 and carries information to the second receiver 13. The second receiver module 1301 may also be referred to as a second receiver unit, a second receiver means, a second receiver circuit, second means for receiving, second output unit etc. The second receiver module 1301 may be a receiver, a transceiver etc. The second receiver module 1301 may be a wireless receiver of the second receiver 13 of a wireless or fixed communications system.

The second receiver 13 may be further configured to, e.g. by means of the second processor 1302, detect the change of the characteristic of the signal by utilizing a reference signal. The second receiver 13 may be further configured to, e.g. by means of the second processor 1302, retrieve the information to the second receiver 13 carried by the signal based on the detected change of the characteristic.

The second receiver 13 may be further configured to discard the information intended for the first receiver 10 in the signal if the second receiver 13 is not the same as the first receiver 10, and to detect the information in the signal intended for the first receiver 10 if the second receiver 13 is the same as the first receiver 10.

The change of the characteristic may be a change relative to a reference signal. The reference signal may be a previously received signal.

The second receiver 13 may be further configured to detect which reference signal that has been used by the transmitter 12.

The change of the characteristic may be at least one of a changed amplitude, a changed phase and a changed time shift.

The second receiver 13 may be further configured to, e.g. by means of the second receiver module 1301, receive, from the transmitter 12, configuration for receiving additional information. The configuration may comprise information regarding a channel carrying the signal, which information comprises at least one of a radio frequency, a set of timeslots used, a training sequence code and modulation used, information regarding how the additional information is mapped to the change in the signal characteristics.

The signal may be a burst in the wireless communication network 100 which uses GSM or which uses a system which has evolved from GSM, or the signal may be a packet in the wireless communication network 100 which uses WiFi.

The transmitter 12 may be a radio base station and the second receiver 13 may be a wireless device, or the transmitter 12 may be a wireless device and the second receiver 13 may be a radio base station, or the transmitter 12 and the second receiver 13 may be wireless devices.

The first receiver 10 may not be the same as the second receiver 13, or the first receiver 10 and the second receiver 13 may be the same receiver.

Figure 10:
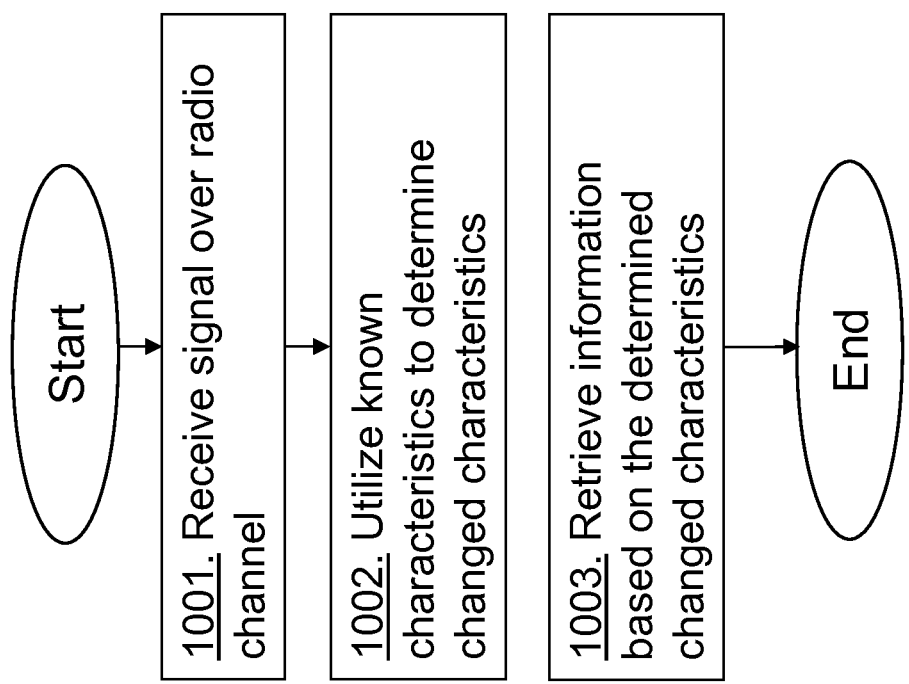
FIG. 10 is a flow chart depicting method actions in the second receiver.

A second computer program may comprising instructions which, when executed on at least one processor (e.g. the second processor 1302), cause the at least one processor to carry out the method as described in FIG. 10. A second carrier may comprise the second computer program, and the second carrier may be one of an electronic signal, optical signal, radio signal or computer readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single Application Specific Integrated Circuit (ASIC), or in two or more separate devices with appropriate hardware and/or software interfaces between them. Several of the functions may be implemented on a processor shared with other functional components of a wireless device or radio base station, for example. Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, Digital Signal Processor (DSP) hardware, Read-Only Memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

The methods according to the embodiments described herein for the transmitter 12 and the second receiver 13 are respectively implemented by means of e.g. a computer program or a computer program product, comprising instructions, i.e., software code portions, which, when executed on at least one processor, cause the at least one processor to carry out the actions described herein. The computer program may be stored on a computer-readable storage medium, e.g. a disc or similar. The computer-readable storage medium, having stored thereon the computer program, may comprise the instructions which, when executed on at least one processor, cause the at least one processor to carry out the actions described herein. In some embodiments, the computer-readable storage medium may be a non-transitory computer-readable storage medium.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Some embodiments described herein may be summarised in the following manner:

A method in a transmitter 12 for transmitting data to a first and a second receiver 10, 13 in a wireless communication network 100. The transmitter 12 is configured to transmit a signal to a first receiver 10 over a radio channel with characteristics carrying phase and amplitude information to be estimated at the first receiver 10. The transmitter 12 determines a change in signal characteristics such as amplitude and/or phase and/or time shift variation relative to reference characteristics be added to the signal. The transmitter 12 then transmits the signal to the second receiver 13, wherein the changed signal characteristics carries information for the second receiver 13.

A method in a second receiver 13 for retrieving information of a signal such as a reference signal or a training sequence from the transmitter 12 in the wireless communication network 100. The second receiver 13 receives the signal from the transmitter 12. The second receiver 13 utilizes known or stored signal characteristic/s to determine the change or the relative change in the signal characteristic/s of the signal. The second receiver 13 then retrieves the information based on the determined changed signal characteristic/s.

Hence, the idea with the embodiments herein is to let relative changes in burst characteristics, such as the burst phase, amplitude and/or timing, that are transparent to a first receiver 10 carry information to a second receiver 13, typically not the same as the first receiver 10, even though this should not be excluded.

The second receiver 13 utilizes the known part of consecutive bursts to detect the information bearing changes in the burst characteristics.

The changes will be detectable by the second receiver 13 as long as changes caused by the channel and/or transmitter/receiver impairments happen at a slower pace than changes introduced by the transmitter, or if they can be predicted.

Even if the burst amplitude and timing do not carry information to the first receiver 10, they may have an impact on how well the first receiver 10 can receive the burst. For a standardized transmission technology, there may also be restrictions in how these characteristics can be changed.

One embodiment is a GSM system. The transmitter 12 sends GSM bursts to a first receiver 10 on a dedicated channel or to many receivers on a broadcast channel. A burst phase is shifted between consecutive bursts according to information bits directed to a second receiver 13. The second receiver 13 uses the known part of each burst, for example the training sequence, to determine how the burst phase has shifted between consecutive bursts.

A transmitter 12 and a second receiver 13 are further provided to perform the methods mentioned above.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a transmitter for transmitting data in a wireless communications network, the method comprising:
   determining a change of a characteristic of a signal, wherein the change of the characteristic is transparent to a first receiver and wherein the change of the characteristic carries information to a second receiver;
   applying the determined change of the characteristic to the signal; and
   transmitting the signal with the applied change to the first receiver and the second receiver.

2. The method of claim 1, wherein the transmitter has knowledge about an absolute characteristic of the signal.

3. The method of claim 1, wherein the change of the characteristic is a change relative to a reference signal.

4. The method of claim 3, wherein the reference signal is a previously transmitted signal.

5. The method of claim 1, wherein the change of the characteristic is at least one of a changed amplitude, a changed phase and a changed time shift.

6. The method of claim 1, further comprising transmitting, to the second receiver, a configuration for receiving additional information.

7. The method of claim 6, wherein the configuration comprises information regarding a channel carrying the signal, which information comprises at least one of a radio frequency, a set of timeslots used, a training sequence code and modulation used, information regarding how the additional information is mapped to the change in the signal characteristics.

8. The method of claim 1 wherein the determined change of the characteristic is transmitted in a super channel to the second receiver, and wherein the super channel overlays another channel in which information is transmitted to the first receiver.

9. The method of claim 1,
   wherein the signal is a burst in the wireless communication network which uses Global System for Mobile communications, GSM, or which uses a system which has evolved from GSM; or
   wherein the signal is a packet in the wireless communication network which uses WiFi.

10. The method of claim 1,
    wherein the transmitter is a radio base station and the second receiver is a wireless device; or
    wherein the transmitter is a wireless device and the second receiver is a radio base station; or
    wherein the transmitter and the second receiver are wireless devices.

11. The method of claim 1,
    wherein the first receiver is not the same as the second receiver; or
    wherein the first receiver and the second receiver is the same receiver.

12. A method performed by a second receiver for retrieving information carried by a signal in a wireless communication network, the method comprising:
    receiving a signal with an applied change of a characteristic from a transmitter, wherein the change of the characteristic is transparent to a first receiver and wherein the change of the characteristic carries information to the second receiver;
    detecting the change of the characteristic of the signal by utilizing a reference signal; and
    retrieving the information to the second receiver carried by the signal based on the detected change of the characteristic.

13. The method of claim 12, further comprising:
    discarding the information intended for the first receiver in the signal if the second receiver is not the same as the first receiver; and
    detecting the information in the signal intended for the first receiver if the second receiver is the same as the first receiver.

14. The method of claim 12, wherein the change of the characteristic is a change relative to a reference signal.

15. The method of claim 14, further comprising detecting which reference signal that has been used by the transmitter.

16. The method of claim 12, wherein the reference signal is a previously received signal.

17. The method of claim 12, wherein the change of the characteristic is at least one of a changed amplitude, a changed phase and a changed time shift.

18. The method of claim 12, further comprising receiving, from the transmitter, configuration for receiving additional information.

19. The method of claim 18, wherein the configuration comprises information regarding a channel carrying the signal, which information comprises at least one of a radio frequency, a set of timeslots used, a training sequence code and modulation used, information regarding how the additional information is mapped to the change in the signal characteristics.

20. The method of claim 12,
   wherein the signal is a burst in the wireless communication network which uses Global System for Mobile communications, GSM, or which uses a system which has evolved from GSM; or
   wherein the signal is a packet in the wireless communication network which uses WiFi.

21. The method of claim 12,
   wherein the transmitter is a radio base station and the second receiver is a wireless device; or
   wherein the transmitter is a wireless device and the second receiver is a radio base station; or
   wherein the transmitter and the second receiver are wireless devices.

22. The method of claim 12,
   wherein the first receiver is not the same as the second receiver; or
   wherein the first receiver and the second receiver is the same receiver.

23. A transmitter for transmitting data in a wireless communications network, the transmitter being configured to:
   determine a change of a characteristic of a signal, wherein the change of the characteristic is transparent to a first receiver and wherein the change of the characteristic carries information to a second receiver;
   apply the determined change of the characteristic to the signal; and to
   transmit the signal with the applied change to the first receiver and the second receiver.

24. The transmitter of claim 23, being further configured to have knowledge about an absolute characteristic of the signal.

25. The transmitter of claim 23, wherein the change of the characteristic is a change relative to a reference signal.

26. The transmitter of claim 25, wherein the reference signal is a previously transmitted signal.

27. The transmitter of claim 23, wherein the change of the characteristic is at least one of a changed amplitude, a changed phase and a changed time shift.

28. The transmitter of claim 23, being further configured to transmit, to the second receiver, a configuration for receiving additional information.

29. The transmitter of claim 28, wherein the configuration comprises information regarding a channel carrying the signal, which information comprises at least one of a radio frequency, a set of timeslots used, a training sequence code and modulation used, information regarding how the additional information is mapped to the change in the signal characteristics.

30. The transmitter of claim 23, wherein the determined change of the characteristic is transmitted in a super channel to the second receiver, and wherein the super channel overlays another channel in which information is transmitted to the first receiver.

31. The transmitter of claim 23,
   wherein the signal is a burst in the wireless communication network which uses Global System for Mobile communications, GSM, or which uses a system which has evolved from GSM; or
   wherein the signal is a packet in the wireless communication network which uses WiFi.

32. The transmitter of claim 23,
   wherein the transmitter is a radio base station and the second receiver is a wireless device; or
   wherein the transmitter is a wireless device and the second receiver is a radio base station; or
   wherein the transmitter and the second receiver are wireless devices.

33. The transmitter of claim 23,
   wherein the first receiver is not the same as the second receiver; or
   wherein the first receiver and the second receiver is the same receiver.

34. A second receiver for retrieving information carried by a signal in a wireless communication network, wherein the second receiver is configured to:
   receive a signal with an applied change of a characteristic from a transmitter, wherein the change of the characteristic is transparent to a first receiver and wherein the change of the characteristic carries information to the second receiver;
   detect the change of the characteristic of the signal by utilizing a reference signal; and to
   retrieve the information to the second receiver carried by the signal based on the detected change of the characteristic.

35. The second receiver of claim 34, being further configured to:
   discard the information intended for the first receiver in the signal if the second receiver is not the same as the first receiver; and to
   detect the information in the signal intended for the first receiver if the second receiver is the same as the first receiver.

36. The second receiver of claim 34, wherein the change of the characteristic is a change relative to a reference signal.

37. The second receiver of claim 34, wherein the reference signal is a previously received signal.

38. The second receiver of claim 34, being further configured to detect which reference signal that has been used by the transmitter.

39. The second receiver of claim 34, wherein the change of the characteristic is at least one of a changed amplitude, a changed phase and a changed time shift.

40. The second receiver of claim 34, being further configured to receive, from the transmitter, configuration for receiving additional information.

41. The second receiver of claim 40, wherein the configuration comprises information regarding a channel carrying the signal, which information comprises at least one of a radio frequency, a set of timeslots used, a training sequence code and modulation used, information regarding how the additional information is mapped to the change in the signal characteristics.

42. The second receiver of claim 34,
   wherein the signal is a burst in the wireless communication network which uses Global System for Mobile communications, GSM, or which uses a system which has evolved from GSM; or
   wherein the signal is a packet in the wireless communication network which uses WiFi.

43. The second receiver of claim 34,
   wherein the transmitter is a radio base station and the second receiver is a wireless device; or
   wherein the transmitter is a wireless device and the second receiver is a radio base station; or
   wherein the transmitter and the second receiver are wireless devices.

44. The second receiver of claim 34,
wherein the first receiver is not the same as the second receiver; or
wherein the first receiver and the second receiver is the same receiver.

\* \* \* \* \*